United States Patent
Quentin et al.

(10) Patent No.: US 11,551,220 B2
(45) Date of Patent: Jan. 10, 2023

(54) METHOD FOR PROCESSING TRANSACTION DATA, CORRESPONDING COMMUNICATIONS TERMINAL, CARD READER AND PROGRAM

(71) Applicant: Banks and Acquirers International Holding, Paris (FR)

(72) Inventors: Pierre Quentin, Eighien les Bains (FR); Christopher Rotsaert, Wasquehal (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 123 days.

(21) Appl. No.: 16/349,833

(22) PCT Filed: Nov. 15, 2017

(86) PCT No.: PCT/EP2017/079338
§ 371 (c)(1),
(2) Date: May 14, 2019

(87) PCT Pub. No.: WO2018/091538
PCT Pub. Date: May 24, 2018

(65) Prior Publication Data
US 2019/0279213 A1    Sep. 12, 2019

(30) Foreign Application Priority Data
Nov. 15, 2016   (FR) ........................................ 1661071

(51) Int. Cl.
*G06Q 20/40*   (2012.01)
*G06Q 20/32*   (2012.01)
(Continued)

(52) U.S. Cl.
CPC ......... *G06Q 20/4014* (2013.01); *G06Q 20/32* (2013.01); *G06Q 20/3223* (2013.01);
(Continued)

(58) Field of Classification Search
None
See application file for complete search history.

(56) References Cited

U.S. PATENT DOCUMENTS 7,617,159 B1 *  11/2009  Donner ................. G06Q 10/02
                                                          705/67
8,364,590 B1 *   1/2013  Casey ................ G06Q 20/3274
                                                          705/42
(Continued)

FOREIGN PATENT DOCUMENTS

CA    2519889 C  *  8/2012  ......... G06K 7/10019
CA    2904114 A1 *  9/2014  ............ G06F 21/83
(Continued)

OTHER PUBLICATIONS

Point of sale terminal security https://www.proquest.com/openview/09f0f9b551f4c875c536af5c4a66321e/1?pq-origsite=gscholar&cbl=18750 (Year: 2014).*
(Continued)

*Primary Examiner* — El Mehdi Oussir
(74) *Attorney, Agent, or Firm* — David D. Brush; Westman, Champlin & on line 1, Koehler, P.A.

(57) ABSTRACT

A method for processing transaction data, implemented by a communications terminal having a touch screen. The method includes: detecting a necessity of entering a piece of personal identification data; transmitting to a card reader connected to the communications terminal a request for supporting a display of a virtual keypad, the request comprising a piece of data representing a passage of the communications terminal from a "master" mode to a "slave"

(Continued)

| OK | Corr | CNL |
|----|------|-----|
| 9  | 2    | 6   |
| 0  | 8    | 1   |
| 5  | 3    | 7   |
|    | 4    |     |

| 0 | 4 | 1 |
|---|---|---|
| 7 | 8 | 6 |
| 3 | 5 | 2 |
|   | 9 |   |
| Corr | CNL | OK |

| 1 | 8 | 4 |
|---|---|---|
| 2 | 7 | 5 |
| 3 | 9 | 6 |
|   | 0 |   |
| CNL | OK | Corr | mode of operation, the slave mode leading to implementation of the method for processing transaction data under the exclusive control of the card reader; of entry, by the user on the virtual keypad, of the piece of personal identification data; and receiving, from the card reader, the piece of personal identification data.

4 Claims, 2 Drawing Sheets

(51) Int. Cl.
    *G06Q 20/34*     (2012.01)
    *G06Q 20/38*     (2012.01)
(52) U.S. Cl.
    CPC ........... *G06Q 20/34* (2013.01); *G06Q 20/353* (2013.01); *G06Q 20/382* (2013.01); *G06Q 20/4012* (2013.01)

(56) References Cited

U.S. PATENT DOCUMENTS

| | | | | |
|---|---|---|---|---|
| 8,639,625 | B1* | 1/2014 | Ginter | H04N 21/4405 |
| | | | | 705/50 |
| 9,235,967 | B1* | 1/2016 | Magee | G06Q 20/401 |
| 9,251,540 | B1* | 2/2016 | Magee | G07F 19/206 |
| 9,324,100 | B2 | 4/2016 | Sather et al. | |
| 9,378,499 | B2* | 6/2016 | Quigley | G06Q 20/3829 |
| 9,946,882 | B2* | 4/2018 | Rotsaert | G06F 21/34 |
| 10,437,469 | B2* | 10/2019 | Forte | G06Q 20/204 |
| 11,182,794 | B1* | 11/2021 | Aument | G06Q 20/3278 |
| 11,257,072 | B1* | 2/2022 | Aument | G06Q 20/3224 |
| 2002/0048369 | A1* | 4/2002 | Ginter | G06F 21/572 |
| | | | | 380/246 |
| 2002/0136214 | A1* | 9/2002 | Do | G06Q 20/4014 |
| | | | | 370/401 |
| 2003/0191719 | A1* | 10/2003 | Ginter | G06F 21/86 |
| | | | | 375/E7.009 |
| 2004/0176032 | A1* | 9/2004 | Kotola | G06Q 20/20 |
| | | | | 455/41.2 |
| 2005/0079817 | A1* | 4/2005 | Kotola | G06Q 20/4097 |
| | | | | 455/41.2 |
| 2005/0187882 | A1* | 8/2005 | Sovio | G06Q 20/382 |
| | | | | 705/64 |
| 2006/0173781 | A1* | 8/2006 | Donner | G06Q 30/0268 |
| | | | | 705/50 |
| 2006/0206919 | A1* | 9/2006 | Montgomery | G06F 21/40 |
| | | | | 726/2 |
| 2008/0214300 | A1* | 9/2008 | Williams | H04L 63/0428 |
| | | | | 463/29 |
| 2009/0157537 | A1* | 6/2009 | Miller | G06Q 10/109 |
| | | | | 348/161 |
| 2010/0255902 | A1* | 10/2010 | Goldstein | G07F 17/3241 |
| | | | | 463/30 |
| 2013/0268357 | A1* | 10/2013 | Heath | G06Q 10/10 |
| | | | | 726/26 |
| 2013/0328801 | A1* | 12/2013 | Quigley | G06Q 20/4012 |
| | | | | 345/173 |
| 2014/0231527 | A1* | 8/2014 | Anderson | G06Q 20/3674 |
| | | | | 235/492 |
| 2014/0358777 | A1* | 12/2014 | Gueh | G06Q 20/1085 |
| | | | | 705/43 |
| 2015/0047007 | A1* | 2/2015 | Colnot | H04L 9/0844 |
| | | | | 726/7 |
| 2015/0088750 | A1* | 3/2015 | Dua | G06Q 20/20 |
| | | | | 705/44 |
| 2015/0142669 | A1* | 5/2015 | Landrok | G06Q 20/363 |
| | | | | 705/71 |
| 2015/0154414 | A1* | 6/2015 | Pike | G06F 21/62 |
| | | | | 726/30 |
| 2016/0012465 | A1* | 1/2016 | Sharp | G06Q 20/386 |
| | | | | 705/14.17 |
| 2016/0048825 | A1* | 2/2016 | Swamy | G06Q 20/3221 |
| | | | | 705/67 |
| 2016/0092877 | A1* | 3/2016 | Chew | G06Q 20/4012 |
| | | | | 705/72 |
| 2016/0104104 | A1* | 4/2016 | Ozkan | G06Q 10/087 |
| | | | | 705/28 |
| 2016/0125181 | A1 | 5/2016 | Dai Zovi | |
| 2016/0210449 | A1* | 7/2016 | Koch | H04L 63/08 |
| 2016/0253651 | A1* | 9/2016 | Park | G07F 9/023 |
| | | | | 705/39 |
| 2016/0307205 | A1* | 10/2016 | Fan | G06Q 30/0623 |
| 2017/0004529 | A1* | 1/2017 | Reimer | G06F 16/9537 |
| 2017/0005972 | A1* | 1/2017 | Reimer | H04W 4/02 |
| 2017/0006101 | A1* | 1/2017 | Reimer | G06Q 30/0625 |
| 2017/0013020 | A1* | 1/2017 | O'Hern | H04W 12/08 |
| 2017/0161724 | A1* | 6/2017 | Lau | G06Q 20/3278 |
| 2017/0161728 | A1* | 6/2017 | Satyanarayan | G06Q 20/401 |
| 2017/0337542 | A1* | 11/2017 | Kim | G06Q 20/227 |
| 2018/0197157 | A1* | 7/2018 | Magee | G07D 11/00 |
| 2019/0034832 | A1* | 1/2019 | Reimer | G06F 16/489 |
| 2020/0364621 | A1* | 11/2020 | Reimer | G06Q 10/0637 |

FOREIGN PATENT DOCUMENTS

| | | | | |
|---|---|---|---|---|
| CA | 3043405 A1 * | 5/2018 | | G06Q 20/32 |
| CN | 103620654 B * | 2/2017 | | G06Q 20/202 |
| CN | 105164694 B * | 3/2019 | | G06F 21/83 |
| KR | 20100010869 A * | 7/2008 | | |
| KR | 20100010871 A * | 7/2008 | | |
| RU | 2300804 C2 * | 6/2007 | | G06F 3/0488 |
| WO | WO-2009143274 A1 * | 11/2009 | | G06Q 30/02 |
| WO | 2014013252 A2 | 1/2014 | | |
| WO | WO-2016189322 A1 * | 12/2016 | | G06F 21/32 |

OTHER PUBLICATIONS

H. R. M. H. Hamid and N. Y. Abdullah, "Physical Authentication Using Random Number Generated (RNG) Keypad Based on One Time Pad (OTP) Concept," 2015 Fourth International Conference on Cyber Security, Cyber Warfare, and Digital Forensic (CyberSec), 2015, pp. 135-139.https://ieeexplore.ieee.org (Year: 2015).*

International Search Report and Written Opinion dated Jan. 10, 2018 for corresponding International Application No. PCT/EP2017/079338, filed Nov. 15, 2017.

English translation of Written Opinion dated Jan. 10, 2018 for corresponding International Application No. PCT/EP2017/079338, filed Nov. 15, 2017.

* cited by examiner

METHOD FOR PROCESSING TRANSACTION DATA, CORRESPONDING COMMUNICATIONS TERMINAL, CARD READER AND PROGRAM

CROSS-REFERENCE TO RELATED APPLICATIONS

This Application is a Section 371 National Stage Application of International Application No. PCT/EP2017/079338, filed Nov. 15, 2017, which is incorporated by reference in its entirety and published as WO 2018/091538 A1 on May 24, 2018, not in English.

1. FIELD OF THE INVENTION

The invention relates to the processing of transaction data. The invention relates more particularly to the processing of transaction data used in a payment operation. The invention relates even more particularly to the processing of transaction data in the context of a payment transaction carried out jointly by a communications terminal and a payment terminal connected to the communications terminal.

2. PRIOR ART

Payment in situations of mobility is a major factor in economic development. This is why many industrialists are proposing mobility payment solutions that are supposed to make life easier for the user. For example, there are many existing solutions that enable a user to make payments with his smartphone. These solutions are mainly of two types: the first type enables the smartphone to make online payment through a dedicated (or non-dedicated) application in order to purchase an item or service that is itself accessible through an online application. These solutions in their spirit are close to bankcard payment solutions that are accessible online through a personal computer and an Internet browser. Many solutions for processing payment transactions have been proposed in this case.

The second type relates to payment in a physical store with one's smartphone. Using a dedicated application, this smartphone simulates the operation of a bankcard, often a contactless bankcard. Again, there is no lack of solutions to carry out this type of simulation and payment.

However, there is a somewhat different set of problems and issues in which the merchant himself is in a situation of mobility or at least a situation in which he does not have any payment terminal. Such a situation can be encountered for example by merchants or professionals who are constantly on the move for their professional activity, for example country doctors, professionals and private cab drivers. These professionals, referred to herein by extension as merchants, need to receive payment from their customers but do not necessarily have the wish or ability to be equipped with independent payment terminals for receiving payment (for example because of the price of such terminals). This is why alternative solutions have been developed. This is the case for example with solutions proposed by the firm Square™. This company thus proposes a bankcard reader that gets connected to the jack socket of a communications terminal. Such a bankcard reader is for example presented in the US document U.S. Pat. No. 9,324,100.

This patent more particularly describes a card reader positioned in a small-sized casing. Such a magnetic reader head is configured to be coupled to a mobile device and the card reader has a slot to scan a magnetic stripe of a card. The read head reads the data on the magnetic stripe and produces a signal indicating data stored on the magnetic stripe. A jack-type output connector is suited for insertion into a port of the mobile device and for delivery of an output signal to the mobile device.

The patent document for its part describes the method for transmitting information with a communications protocol to a mobile device by means of a card reader provided with a read head that has a slot for swiping a magnetic stripe of a card, an output jack and an electronic device that comprises a microcontroller. The read head is used to read the data on a magnetic stripe of a card. A raw magnetic signal is produced representing data stored on the magnetic stripe. The taw magnetic head signal is converted into a processed digital signal that the microcontroller can interpret. A Manchester type synchronous stream is produced and transmitted to the communications terminal by means of the jack connector.

Other solutions of this type also exist, especially to enable the use of a card with integrated circuit instead of (or in addition to) a magnetic stripe card. Besides, other solutions of this type do not require any physical connection between the communications terminal and the card reader: a wireless connection (of the Bluetooth type) can easily be envisaged and proposed. The advantage is that it is not necessary to link the communications terminal and the card reader. The drawback is that the card reader must therefore be provided with its own power means (battery or additional current source), which implies a greater logistical organization and relative discomfort. There are also connection solutions using a USB port instead of the jack port.

Be that as it may, these solutions therefore enable the merchant to receive payment through his mobile terminal (the smartphone) which then acts as a payment terminal and as a cash register. The advantage, for the merchant is obvious: he does not need to have a payment terminal, which is often costly and takes up much space, in order to receive payment. Besides, the card reader is compact, light and takes up little space. This approach however has two drawbacks. The first drawback relates to costs (commissions) which are deducted in order to make payment. Indeed, the use of such a device currently requires that a part of the amount of the transaction should be paid back to the company supplying the card reader. This problem however is more of an economic problem than a technical one. The second problem relates to the relative absence of security of payment data. Indeed, in these solutions, the card reader is in charge of reading data of the bankcard whether it is data coming from a magnetic card or data coming from an integrated circuit card. The transmission of this data to the mobile terminal is done by the card reader once this data is read. The bank card data are (normally) encrypted by the card reader and then transmitted to the communications terminal according to an encryption method proper to the designer of the solution. Thus, adequate securing steps are taken for the transmission of data to the communications terminal. By contrast, the communications terminal itself is not necessarily secure (unlike a "classic" payment terminal). It is therefore possible (and probable) that a communications terminal will be given an unauthorized modification, for example by a fraudulent individual, in order to retrieve the bankcard data that is used by the communications terminal to make payment transactions. To carry out such an unauthorized modification of the communications terminal, the fraudulent individual can for example propose an application in an applications store, this application having non-fraudulent basic functions and a fraudulent function whose goal is to retrieve the data of the bankcard.

Now it is very difficult or even impossible to ensure securing of the merchant's communications terminal and this is so for several reasons. The first reason relates to the great diversity of communications terminals presenting the market: the number of models of terminals is such that it is in practice impossible to have full control over the hardware and software architectures of all these terminals. This is especially the case with low-cost "Chinese" terminals whose design is often a non-optimized copy of the design of existing terminals made by other manufacturers (such as Korean or American manufacturers) and especially do not integrate trusted execution environments, secure memories and high-precision management of secure elements (for reasons of cost and absence of technological skills). The second reason relates to the fact that the communications terminal is above all a multimedia general-purpose terminal: it is not aimed at secure data processing. There is therefore no restriction on the installation of applications or contents on this terminal.

The risk of bankcard data theft is an even more of a problem when accompanied by the theft of the PIN code of these cards. Indeed, as explained earlier, existing devices manage payment by using either magnetic stripe cards or integrated-circuit cards. In general, the use of a magnetic stripe makes it necessary to set down a handwritten signature to validate the payment. In this case, the user uses a stylus and/or a finger to sign on the screen of the merchant's communications terminal. The use of a integrated-circuit card for its part requires the use of a PIN (personal identification number) code to validate the transaction. To enter this PIN, the user uses a virtual keypad displayed on the screen of the communications terminal to enter his PIN. Now, by stealing this PIN code together with the bankcard data, a fraudulent person can make an integral copy of the user's (customer's) payment card without the knowledge of the customer and of the merchant himself. Now, the display of the virtual keypad for entering the PIN code is managed by the payment application which is installed on the communications terminal (this is the payment application matched with the card reader connected to the communications terminal). There are several possibilities of fraud: in a first possibility, the digits derived from the elements keyed into the virtual keypad are retrieved directly from the memory of the communications terminal by reading the memory zone where this code is temporarily recorded after entry. A second possibility of fraud is that of mimicking the appearance of the virtual keypad of the payment application and asking for the entry of the PIN code in addition to (or instead of) the entry requested by the legitimate payment application. Other possibilities of fraud exist but it is not the object here to describe them in detail.

Be that as it may, it is dangerous to enter a PIN code on a payment application executed on a smartphone. There is therefore a need to provide a solution for entering PIN codes that ensures confidentiality of the code entered in order to limit the possibilities of fraud resulting from the use of a communications terminal to make a payment.

3. SUMMARY OF THE INVENTION

The invention does not have at least some of these drawbacks of the prior art. More particularly, the invention proposes a method for processing transaction data, the method being implemented by means of a communications terminal having a touchscreen, a method of the type comprising an entry, during a transaction, on said touchscreen of said communications terminal, of a piece of personal data of a user.

The method comprises, at the communications terminal:
a step for detecting a necessity of entering a piece of personal identification data;
a step of transmission, to a card reader connected to the communications terminal, of a request for supporting the display of a virtual keypad;
a step of entry, by said user on said virtual keypad, of the piece of personal identification data;
a step of reception, from the card reader, of said piece of personal identification data.

Thus, the proposed solution enables the performance of a portion of the actions needed to implement a payment transaction in taking advantage of an external device that is used as an independent entity. The result of this is that the external device, also called a card reader, independently performs at least one action that is part of the verification of the user's knowledge of this piece of secret data that can be the PIN code or any other appropriate data in the validation of the transaction.

Besides, during the independent implementation in said card reader, the invention comprises:
a step of reception, from the communications terminal, of the request for supporting the display of a virtual keypad;
a step for generating the virtual keypad to be displayed on said touchscreen of said communications terminal;
a step for obtaining the piece of personal identification data by means of said virtual keypad; and
a step of transmission of the piece of personal identification data to the communications terminal.

According to one particular characteristic, said piece of personal identification data received during said step of reception is encrypted by means of an encryption key of the card reader.

According to one particular characteristic, the method comprises a step of transmission of the piece of personal identification data to a transaction management server to which the communications terminal is connected.

According to one particular characteristic, the step for generating the virtual keypad to be displayed on said touchscreen comprises the obtaining of at least one random number or pseudo-random number and the location of the keys of said virtual keypad is determined as a function of at least one random number or pseudo-random number.

According to one particular embodiment, the card reader complies with a payment transaction data-processing standard.

According to one particular characteristic, the request for supporting the display of a virtual keypad comprises a piece of data representing a passage of said communications terminal from a mode of operation called a "master" mode to a mode of operation called a "slave" mode, this second mode of operation leading to the implementation of said transaction data processing method under the exclusive control of the card reader.

According to one particular embodiment, said card reader is an integrated-circuit card reader.

According to another aspect, the invention also relates to a communications terminal comprising means for processing transaction data, the communications terminal having a touchscreen, a terminal comprising means of entry on said touchscreen of a piece of personal identification data of a user, said terminal comprising:
  means for detecting a necessity of entering a piece of personal identification data;
  means of transmission, to a card reader connected to the communications terminal, of a request for supporting the display of a virtual keypad;
  means of entry, by said user on said virtual keypad, of the piece of personal identification data;
  means of reception, from the card reader, of said piece of personal identification data.

According to another aspect, the invention also relates to a card reader comprising means for processing transaction data, further comprising means of communication with a communications terminal with which it is liable to be connected during the processing of a transaction, said card reader comprising:
  means of reception, from the communications terminal, of a request for supporting the display of a virtual keypad;
  means for generating the virtual keypad to be displayed on a touchscreen of said communications terminal;
  means for obtaining a piece of personal identification data by means of said virtual keypad; and
  means of transmission of the piece of personal identification data to the communications terminal.

According to a preferred implementation, the different steps of the methods according to the invention are performed by one or more software programs or computer programs comprising software instructions that are to be executed by a data processor according to the invention and are designed to control the execution of the different steps of the methods.

The invention is therefore aimed at providing a program capable of being executed by a computer or by a data processor, this program comprising instructions to command the execution of the steps of a method as mentioned here above.

This program can use any programming language whatsoever and can be in the form of source code, object code or intermediate code between source code and object code such as in a partially compiled form or in any other desirable form whatsoever.

The invention is also aimed at providing an information carrier or medium readable by a data processor, and comprising instructions of a program as mentioned here above.

The information medium can be any entity or device whatsoever capable of storing the program. For example, the medium can comprise a storage means such as a ROM, for example, a CD ROM or microelectronic circuit ROM or again a magnetic recording means, for example a floppy disk or a hard disk drive.

Besides, the information support can be a transmissible support such as an electrical or optical signal, that can be conveyed by an element or optical cable, by radio or by other means. The program according to the invention can be especially downloaded from an Internet type network.

As an alternative, the information carrier can be an integrated circuit into which the program is incorporated, the circuit being adapted to execute or to be used in the execution of the method in question.

According to one embodiment, the proposed technique is implemented by means of software and/or hardware components. In this respect, the term "module" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing the hardware resources of this physical entity (memories, recording media, communications buses, input/output electronic boards, user interfaces etc).

In the same way, a hardware component corresponds to any element of a hardware assembly capable of implementing a function or a set of functions according to what is described here below for the module concerned. It can be a programmable hardware component or a component with an integrated processor for the execution of software, for example, an integrated circuit, smart card, a memory card, an electronic board for the execution of firmware etc.

Each component of the system described here above can of course implement its own software modules.

The different embodiments mentioned here above can be combined with one another to implement the proposed technique.

4. DRAWINGS

Other features and advantages of the invention shall appear more clearly from the following description of a preferred embodiment, given by way of a simple illustratory and non-exhaustive example and from the appended drawings, of which.

5. DESCRIPTION 5.1. Reminders

As explained here above, it is an object of the present invention to prevent theft of data during the entry of a personal identification code on a smartphone type of communications terminal in order to carry out a transaction, for example a payment transaction (the transaction may also be of other types, for transactions relating to medical prescriptions, transactions relating to signatures of electronic documents, etc.). The goal is to secure the entry of data on a touchscreen which, in principle, is not secured (as understood in the context of a PCI PED pin entry device). Thus, in the prior art where the invention is not implemented, it cannot be made sure that the PIN code or the password or any other piece of identification data will not be stolen or misused.

The proposed technique is situated in the context of a relatively precise procedural framework in which the communications terminal is connected with a card reader (a reader of magnetic stripe payment cards, a reader of integrated-circuit type payment cards, a reader of contactless payment cards, cards using other technologies) and an identification of the user must be carried out in order to validate the transaction (by entry of a PIN code for example or by entry of any other confidential information that might be associated with the validation of a transaction: it may for example be a password, a permanent verification code or periodic verification code), the identification and the transaction being normally carried out by means of the communications terminal.

The general principle of the invention takes advantage of the relative security given by the card reader to share the implementing of the transaction, more particularly to share the phase of verification of knowledge of a secret by the user (PIN code, password, etc.). Several embodiments of this principle are described here below. Generally, however, a method is proposed for managing the virtual keypad to be displayed on the communications terminal by the card reader. More particularly, whatever the embodiments implemented, it is proposed that the management of the virtual keypad displayed on the screen of the communications terminal should be at least partly implemented by the card reader.

Figure 1:
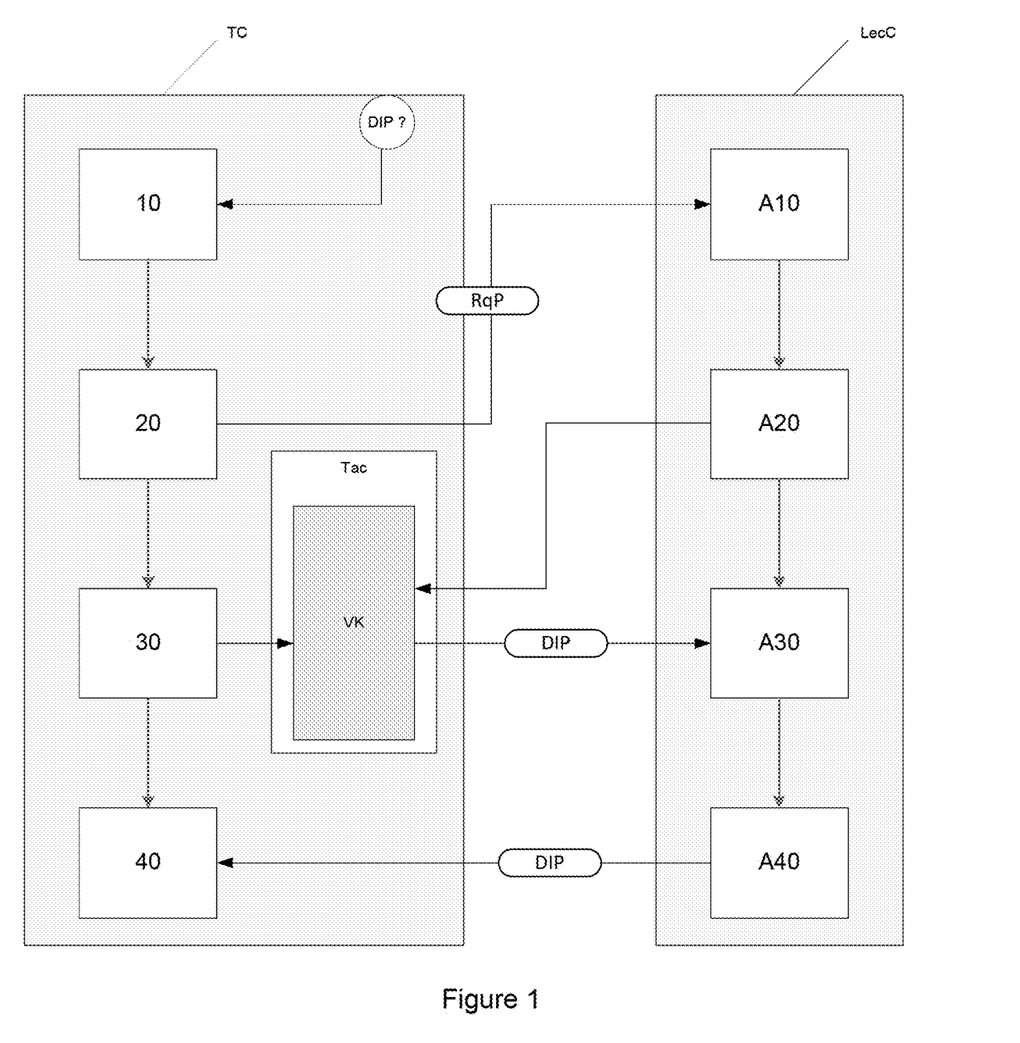
FIG. 1 is a block diagram of the proposed technique for the entry of a piece of personal identification data.

Referring now to FIG. 1, we present the general principle of the technique described here.

The invention relates more particularly to a method for processing transaction data, implemented by means of a communications terminal (TC) having a touchscreen (Tac), a method of the type comprising an entry, during a transaction on said touchscreen (Tac) of said communications terminal (TC), of a piece of personal identification data (DIP) of a user, the method comprising, at the communications terminal (TC):

a step of detection (10) of a necessity of entering a piece of personal identification data (DIP);

a step of transmission (20) to a card reader (LecC) connected to the communications terminal (TC) of a request (RqP) for supporting the display of a virtual keypad (VK);

a step of entry (30), by said user on said virtual keypad (VK), of the piece of personal identification data (DIP);

a step of reception (40) from the card reader (LecC), of said piece of personal identification data (DIP).

Thus, in general, the card reader takes charge of the management of the processing of the piece of personal identification data in place of the communications terminal. This makes it possible to deprive a malware of such data. The personal identification data is transmitted to the communications terminal by "indirection": this means that although the entry is made on the touchscreen of the communications terminal, the party receiving this entry is not first of all the communications terminal but the card reader connected to the communications terminal, this card reader then transmitting the results of this entry to the communications terminal.

Thus, from the viewpoint of the card reader, the method comprises:

a step of reception (A10) from the communications terminal (TC) of the request (RqP) for supporting the display of a virtual keypad (VK);

a step of generation (A20) of the virtual keypad (VK) to be displayed on said touchscreen (Tac) of said communications terminal (TC);

a step (A30) for obtaining the piece of personal identification data (DIP) by means of said virtual keypad (VK); and a step of transmission (A40) of the piece of personal identification data (DIP) to the communications terminal (TC).

It is of course possible to envisage several embodiments and variants for implementing this method. Two main embodiments however can be distinguished:

in the first embodiment presented here below, the card reader carries out a total control on the inputs and outputs from the communications terminal: at the time of entry of the PIN code or of the password, the card reader takes control of the communications terminal, displays the virtual keypad and receives the entries entered by the user (PIN code, password, etc.) and transmits this data, in encrypted form, to the communications terminal;

in the second embodiment, the card reader receives a request, from the communications terminal, for obtaining a virtual keypad; the card reader randomly generates a virtual keypad which it encrypts and transmits to the communications terminal (this is for example an image generated by the card reader); the communications terminal decrypts this virtual keypad and displays it (it displays the image transmitted by the card reader); the communications terminal receives the entries made by the user: it encrypts these entries and transmits them to the card reader: the card reader decrypts the entries and establishes the correspondence with the encrypted entries to obtain the PIN code which it encrypts and transmits in turn to the communications terminal.

Figure 2:
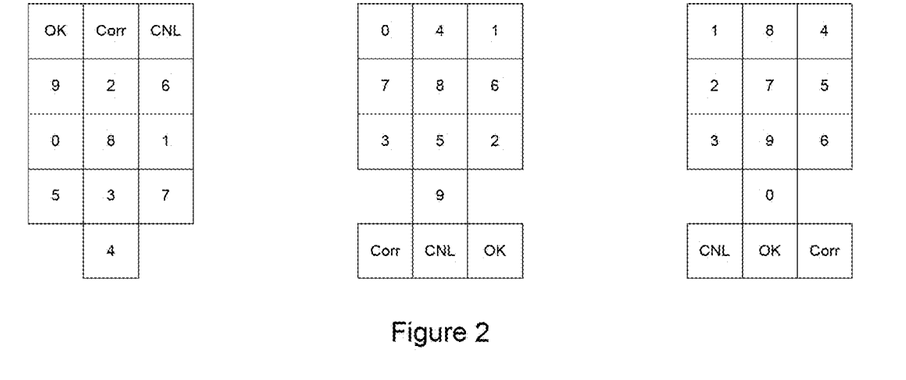
FIG. 2 presents three randomly generated numerical keypads.

FIG. 2 presents examples of virtual numerical keypads randomly generated by the card reader. The random generation of the virtual keypad comprises the obtaining of at least one random number or pseudo-random number; the position of the keys of the virtual keypad is determined as a function of said at least one random number or pseudo-random number. More particularly, at least two random elements can be taken into account: the first relating to the position of the validation key (OK), the cancellation key (CNL) and the correction key (Corr) and the second relates to the way in which the keys are laid out. Thus, it is very difficult to determine the position of the keys.

It is assumed that the card reader is secured although this is not necessary from the viewpoint of the general principle of the invention: according to this principle, the communications terminal is steered from the exterior (from the card reader). It is also assumed that the card reader has sufficient data-processing capacities and sufficient memory to carry out the above-mentioned operations.

Here below, an embodiment applied to the implementing of a payment operation is presented. It is clear however that this embodiment should not be taken as be exhaustive and that any other embodiment bringing into play the management, by a card reader, of a portion of a transaction comprising the entry of a piece of personal identification data on a touchscreen comes within the framework of the present technique.

5.2. Description of One Embodiment

5.2.1. Progress of a Transaction

In this embodiment, it is assumed that a communications terminal is physically connected to a card reader by means of an OTG type USB port. The card reader for its part is a payment card reader enabling at least the reading of integrated-circuit cards. The payment card reader receives a power supply from the communications terminal through the USB port of the communications terminal. The communications terminal executes a payment application (also called an MPEA application or simply an MPEA). This payment application is in charge of making the payment transaction jointly with the payment card reader. It is also assumed in this embodiment that the card reader is secure. It is for example compliant with the PCI PTS standard. The card reader also comprises a processor of bankcard data, a memory, means of communication with a communications terminal (in the present case these are connection means implementing a USB connection). The card reader differs from existing card readers in that it comprises means for taking temporary control over the communications terminal: this taking of control extends to the taking of control over the entry and the taking of control over display.

The card reader also differs from existing card readers in that it has additional encryption means as compared with existing card readers. The encryption means are understood to be means for encrypting not just bankcard data but also other data such as input and output data which are transmitted and received through the communications terminal.

This embodiment makes use of the secure character of the card reader (the card reader) to make this card reader carry out sensitive operations in place of the communications terminal deemed to be unreliable for these sensitive operations. More particularly, in this embodiment, the entry of the PIN code is done jointly with the card reader as explained in the general principle.

In this embodiment, during the implementing of the application for managing transactions (payment application) on the communications terminal prior to the entry of the PIN code on the screen of the communications terminal (touch entry), this application sends the card reader a switching command. When this command is received by the card reader, it causes a switch-over into "master" mode. This results in a transmission by the card reader of an optional command in "slave" mode to the communications terminal.

Once this command has been received, the card reader passes into "master" mode in which it controls both the inputs and the outputs of the communications terminal. In this mode, the inputs and the outputs are therefore managed by the card reader. The card reader therefore carries out a more or less extensive sequence of actions in order to carry out a processing of the transaction data and efficiently perform the payment transaction. More particularly, the card reader:

generates the virtual keypad (VK) to be displayed on said touchpad screen (Tac) of said communications terminal (TC); this generation can be random, although it is not necessarily so in the embodiment since the entry of the PIN code is under the total control of the card reader;

transmits this virtual keypad (VK) to the communications terminal accompanied by a display command;

receives the data derived from the entry of the PIN code made by the user on the virtual keypad (VK);

determines the corresponding PIN code;

encrypts the PIN code with an encryption key and optionally commands the communications terminal to transmit this PIN code to a remote server for the processing of payment transactions (a bank server) which thereafter verifies the validity of the code entered (online validation).

This way of proceeding ensures that the entry of the PIN code on the touchpad screen of the communications terminal complies with the security standards required for a validation of transaction, and especially that this entry is compatible with the implementing of a "card present" type of EMV payment transaction.

In another embodiment, in which the card reader does not check the communications terminal, the following steps are implemented:

generating the virtual keypad (VK) to be displayed on said touchpad screen (Tac) of said communications terminal (TC); this generation can advantageously be random, especially as regards the positioning of the correction, validation and cancellation keys and it can even be totally random as regards the positioning of the numerical keys;

sends the communications terminal this virtual keypad (VK), possibly encrypted by means of a sessions key shared with the communications terminal;

receives the data coming from the entry of the PIN code made by the user on the virtual keypad (VK): these are coordinates, as in the first example, making it possible to match these coordinates with the keypad generated;

determines the corresponding PIN code;

encrypts the PIN code with an encryption key and transmits this PIN code to the communications terminal.

The communications terminal then sends this PIN code to a remote payment transaction processor (bank server) which then verifies the code entered (online validation). This way of proceeding makes sure that the entry of the PIN code on the touchpad screen of the communications terminal complies with security standards.

5.3. Audit

In all the embodiments, in addition to the operations that the card reader carries out on behalf of the MPEA application, it is furthermore capable of carrying out an audit of the communications terminal itself. According to the operational constraints and parameter-setting constraints of the card reader, this audit is carried out as follows:

whenever the card reader is connected to a new communications terminal: an audit of this new communications terminal is carried out;

depending on a predetermined number of transactions managed by the communications terminal and/or the card reader: when a predetermined number of transactions has been performed, a control audit is executed by the card reader in order to ensure the constant reliability of the communications terminal;

according to a predetermined time periodicity: when a predetermined number of days has elapsed, a control audit is executed by the card reader in order to ensure the constant reliability of the communications terminal.

The audit consists firstly in verifying the integrity of the apparatus and especially in verifying that the apparatus has not undergone unauthorized software updates of the "jailbreak" or "rooting" type. Secondly, the audit may consist of a verification of the applications installed on the apparatus and especially of a search made for applications known to raise problems of security. To this end, the card reader compares each application installed on the communications terminal with a predetermined blacklist of applications. This blacklist, as specified here below, can be transmitted by means of an external third-party entity connected to the communications terminal by means of a communications network. When the card reader spots an unauthorized software update and/or the installation of an unauthorized application, a message is transmitted to the MPEA application and the card reader switches into a state of inactivity (i.e. it becomes impossible to carry out a transaction using the card reader). The MPEA application takes charge of warning the merchant that it is impossible to use the card reader.

The audit can also consist of a series of routines for verifying efficient operation, the goal of these routines being to simulate the implementing of payment transactions. During this audit, the MPEA application and the card reader simulate the implementing of the transaction. The goal of this simulation is to enable the card reader to verify the efficient operation of the transaction and specially to verify that the encrypted data and/or hashed data coming from the implementation of the transaction do not undergo any degradation and/or attempts at degradation during the execution of the fictitious transaction. The goal here is to detect an error that could occur during the fictitious transaction. On request from the card reader, the MPEA application, launches a fictitious transaction with fictitious (but predetermined) bankcard data of the merchant. The card reader also knows these fictitious data of the merchant (which are recorded in a secure memory space of the card reader). The MPEA application requests the card reader for bankcard data. The card reader uses fictitious bankcard data, also recorded within a memory space of the card reader that is secure (and known to the MPEA application), and transmits these data in encrypted form to the MPEA application to simulate the insertion of the bankcard. The MPEA application verifies the compliance of the data received: if the data are not compliant with the data known to the MPEA application, then this application is capable of detecting an operating anomaly (either an anomaly in the communications terminal or an anomaly in the card reader) and the MPEA application does not function.

Another audit phase is also carried out to obtain the fictitious PIN code: the MPEA application asks for the management of this part of the transaction by the card reader. The card reader implements this part of the transaction and awaits the supply, by the MPEA application, of a fictitious PIN code known to it. When the PIN code received is different from the expected fictitious PIN code, the card reader is capable of detecting the occurrence of a problem and therefore of stopping its operation.

The goal is also to detect a possible degradation of the operation of the MPEA application. To implement this part of the audit, the card reader forges a series of challenges that the MPEA application must be capable of resolving.

Thus, in at least one embodiment, as has just been explained, the audit is made by combining the operation of the MPEA application and of the card reader. It may be recalled indeed that the implementation of a transaction requires both the MPEA application and the card reader. The MPEA application and the card reader can be created/built by different independent manufacturers but they share a predefined mode of interaction in the present invention. These combined audits make it possible to detect both a degradation in the working of the card reader and a degradation in the working of the communications terminal and/or the MPEA application.

In at least one embodiment, the card reader furthermore comprises updating means, for example means to update parameters (such as lists of undesirable applications) and/or means to update encryption keys. Preferably, these means are controlled through the MPEA application, which acts on the instructions of an updating server, used to transmit updating data to the card reader. To verify the authenticity of these data provided by the communications terminal, the card reader implements for example a mechanism for managing encrypted tokens that are generated successively in the form of encrypted blocks by the server. Thus, the card reader is able to guard against any unauthorized updating attempt by a corrupted MPEA application.

5.4. Other Characteristics and Advantages

The above embodiment has been described in assuming that the card reader is capable of controlling the operation of the communications terminal and that the communications terminal is capable of accepting a control by the card reader. There are several variants of the general principle of the invention which can be replaced by and/or combined with the above embodiment and this can be done without departing from the principle of having a part of the transaction performed by a card reader which, in principle, is not subjected to malicious actions (this card reader is ideally secure).

In an already presented variant, instead of exercising control by means of the card reader on the communications terminal, the card reader is used to generate and transmit a specific screen mask. Thus, in this variant, rather than giving control to the card reader (control given to carry out a part of the transaction), the card reader is asked to generate screens (or screen masks) that will be displayed by the communications terminal.

A first possibility, in this first variant, is to ask the card reader to generate a screen mask representing a PIN code entry keypad: upon request by the communications terminal, the card reader randomly generates a screen mask representing the virtual keypad of the pinpad and transmits this virtual keypad to the communications terminal. The communications terminal retrieves this screen mask and displays it for the user: the user enters his PIN code using the keys of the screen mask transmitted by the card reader; the communications terminal obtains the coordinates of the keys entered by the user and transmits these coordinates to the card reader. The card reader, on the basis of the screen mask and the entered coordinates, transmits the PIN code (or an encrypted version of the PIN code), entered by the user, and this is then used by this communications terminal to finalize the payment transaction.

A second possibility, in this first variant, consists in carrying out an operation similar to that of the first possibility but in the case of a complete keypad, for example used for the entry of a password.

In a second variant, the card reader receives a command for obtaining session keys, a command in which the communications terminal requests the transmission of one or more session keys to be used for firstly to encrypt the data entered on the communications terminal and/or secondly initialize the exchanges with a remote transaction server. The first situation (encryption of the data entered by the communications terminal) ensures that only authorized entities are capable of carrying out an encryption or a decryption of the data entered: it however does not make it possible to ensure that a malicious application has not intercepted this data beforehand (i.e. before the data are encrypted). The second situation (initializing the exchanges with a remote transaction server) makes it possible to accelerate the exchanges with this server (because there is no need to implement an exchange of keys on a communications network) and therefore makes it possible to greatly accelerate the general processing of the payment transaction.

In a third variant, the card reader receives an obfuscation command in which the communications terminal asks for the transmission of a secure execution library. The secure execution library is a library of codes that enables the management of at least a part of the payment transaction. In the prior art solutions, this library is integrated into the payment application which is downloaded onto the communications terminal. In this variant, this library is received by the communications terminal from an external entity, shortly before the verification of the user's personal data (PIN code, password, secure signature, etc.). Two possibilities are offered for the reception of this library:

the first consists in receiving this library directly from an external entity, upon a request from the communications terminal to this external entity, during the implementation of the transaction. The external entity, receiving the request from the communication terminal, verifies the validity of the request (using data contained in the request: the identifier of the communications terminal and data on the verification of the merchant's account), sets up a secure connection with the communications terminal and, through this secure connection, transmits the library to be executed. The transmitted library is modified by the external entity prior to its transmission, on the basis of a piece of obfuscation data locally obtained by the external entity;

the second possibility consists in using the card reader: the communications terminal asks for a piece of resetting data from the card reader; the card reader prepares a piece of initialization data intended for the external entity: this initialization data comprises a piece of obfuscation data and an identifier of the card reader; the initialization data is transmitted by the card reader to the communications terminal which, in a request for obtaining a library, transmits this piece of initialization data to the external entity. The external entity receiving the request from the communications terminal verifies the validity of the request (by means of data contained in this request: the identifier of the communications terminal, data related to the verification of the merchant's account), sets up a secure connection with the communications terminal and, using this secure connection, transmits the library to be executed which has been modified with the piece of obfuscation data provided by the card reader.

5.5. Devices for Implementation

Figure 3:
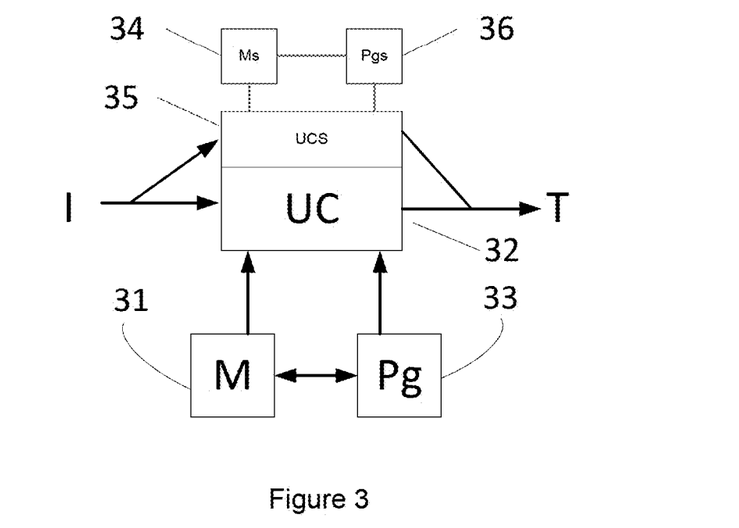
FIG. 3 describes a communications terminal for the implementing of the processing method described.

Referring to FIG. 3, we describe a communications terminal implemented to manage the entry of personal identification data according to the method described here above.

For example, the communications terminal comprises a memory 31 comprising for example a buffer memory, a general processor 32, equipped for example with a microprocessor and controlled by a computer program 33 and/or a secure memory 34, a secure processor 35, controlled by a computer program 36, these processing units implementing data-processing methods as described here above to carry out transaction data-processing operations, which are at least partly implemented in conjunction with a card reader connected to the communications terminal.

At initialization, the code instructions of the computer program 36 are for example loaded into a memory and then executed by the secure processor 35. The secure processor 35 inputs at least one piece of data representing a necessity to enter a piece of personal identification data. The secure processor 35 implements the steps of the method of processing according to the instructions of the computer program 36 to transmit to the card reader a request for obtaining personal identification data.

To this end, the communications terminal comprises, in addition to the memory 34, means of communication such as network communications modules, data transmission means and data transmission circuits for transmitting data between the various components of the communications terminal.

The means described here above can take the form of a particular processor implemented within a terminal such as a payment terminal. According to one particular embodiment, the communications terminal implements a particular application that is in charge of carrying out the operations described here above, this application being for example given by the manufacturer of the processor in question in order to enable the use of said processor. To this end, the processor comprises unique identification means. These unique identification means ensure the authenticity of the processor.

Figure 4:
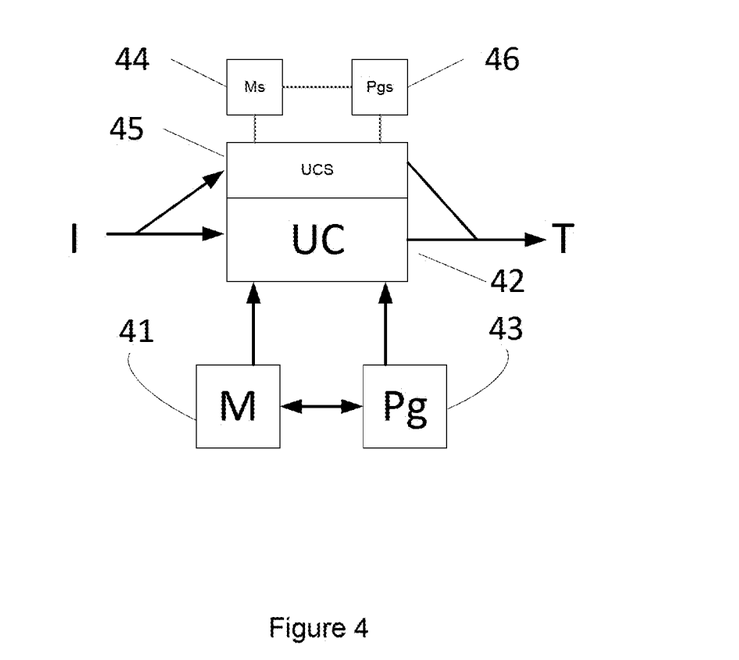
FIG. 4 describes a card reader for the implementing of the processing method described.

Referring to FIG. 4, we describe a card reader implemented to manage the obtaining of personal identification data according to the method described here above.

For example, the card reader comprises a memory 41 comprising for example a buffer memory, a general processor 42 equipped for example with a microprocessor and controlled by a computer program 43 and/or a secure memory 44, a secure processor 45 controlled by a computer program 46, these processing units implementing data-processing methods as described here above to carry out the generation of a virtual keypad to be displayed on the touchpad screen of the communications terminal.

At initialization, the code instructions of the computer program 46 are for example loaded into a memory and then executed by the secure processor 45. The processor 45 inputs at least one piece of data representing a request for generating a virtual screen. The secure processor 45 implements the steps of the method of processing according to the instructions of the computer program 46 to generate a virtual screen, transmit it to the communications terminal, obtain data representing keys entered by the user and transmit the corresponding identification data to the communications terminal.

To this end, the card reader comprises, in addition to the memory 44, communications means such as network communications modules, data transmission means and data transmission circuits for transmitting circuits between the various components of the card reader.

The means described here above can take the form of a particular processor implemented within a terminal such as a payment terminal. According to one particular embodiment, the card reader implements a particular application which is in charge of carrying out the operations described here above, this application being for example provided by the manufacturer of the processor in question in order to enable the use of said processor. To this end, the processor comprises unique identification means. These unique identification means ensure the authenticity of the processor.

The invention claimed is:

1. A method for processing transaction data, the method comprising:

detecting, by a communications terminal having a touchscreen, a necessity of entering a piece of personal identification data during a transaction;

transmitting, by the communications terminal, to a card reader connected to the communications terminal by using an OTG (On-The-Go) type USB (Universal Serial Bus) port, a request for display of a virtual keypad on the touchscreen, said request comprising a piece of data representing a passage of said communications terminal from a mode of operation called a master mode to a mode of operation called a slave mode;

receiving, by the card reader, the request for the display of the virtual keypad;

in response to receiving the request for display of the virtual keypad, switching the communications terminal to the slave mode of operation;

generating, by the card reader, the virtual keypad to be displayed on said touchscreen of said communications terminal, comprising obtaining at least one random number or pseudo-random number and locating keys of said virtual keypad as a function of the at least one random number or pseudo-random number;

transmitting the virtual keypad from the card reader to the communications terminal through the OTG type USB port;

the communications terminal displaying the virtual keypad on the touchscreen of the communications terminal under at least partial control of the card reader;

receiving, by the card reader, through the OTG type USB port, an entry of the piece of personal identification data, from said user using said virtual keypad, which is at least partly controlled by the card reader;

encrypting of the piece of personal identification data using an encryption key of the card reader;

receiving, by the communications terminal from the card reader, the encrypted piece of personal identification data entered through the virtual keypad; and the communications terminal processing the transaction by transmitting to a transaction server at least the encrypted piece of the personal identification data received from the card reader.

2. The method according to claim 1, wherein the card reader complies with a payment transaction data-processing standard.

3. A system comprising:
a communications terminal comprising:
  an OTG (On-The-Go) type USB (Universal Serial Bus) port;
  a touchscreen;
    a first processor; and
    a first memory storing first computer program code instructions, when executed by the first processor cause the first processor to perform operations comprising:
  detecting a necessity of entering a piece of personal identification data during a transaction;
  transmitting, to a card reader connected to the communications terminal by using the OTG type USB port, a request for display of a virtual keypad on the touchscreen, comprising a piece of data representing a passage of said communications terminal from a mode of operation called a master mode to a mode of operation called a slave mode;
  in response to the card reader receiving the request for display of the virtual keypad, switching the communications terminal to the slave mode of operation;
  receiving through the OTG type USB port the virtual keypad from the card reader, the virtual keypad having been generated by the card reader;
  displaying the received virtual keypad on the touchscreen of the communications terminal under at least partial control of the card reader;
  the touchscreen receiving an entry, from said user on said virtual keypad, which is at least partly controlled by the card reader, of the piece of personal identification data; and
  receiving through the OTG type USB port, from the card reader, said piece of personal identification data entered through the virtual keypad generated by the card reader, the piece of personal identification data received from the card reader being encrypted by using an encryption key of the card reader;
  processing the transaction by transmitting to a transaction server at least the encrypted piece of the personal identification data received from the card reader; and
the card reader comprising:
  a second processor; and
  a second memory storing second program code instructions, when executed by the second processor cause the second processor to perform operations comprising:
    receiving, from the communications terminal, through the OTG type USB port, the request for display of the virtual keypad on the touchscreen of the communications terminal;
    generating the virtual keypad to be displayed on the touchscreen of said communications terminal, comprising obtaining at least one random number or pseudo-random number and locating keys of said virtual keypad as a function of the at least one random number or pseudo-random number;
    transmitting the virtual keypad to the communications terminal through the OTG type USB port or controlling the communications terminal through the OTG type USB port to display the virtual keypad on the touchscreen;
    obtaining the piece of personal identification data entered through the touchscreen using said virtual keypad via the OTG type USB port;
    encrypting the piece of personal identification data using the encryption key of the card reader; and
    transmitting the encrypted, obtained piece of personal identification data to the communications terminal.

4. The system according to claim 3, wherein the card reader complies with a payment transaction data-processing standard.

* * * * *